United States Patent Office

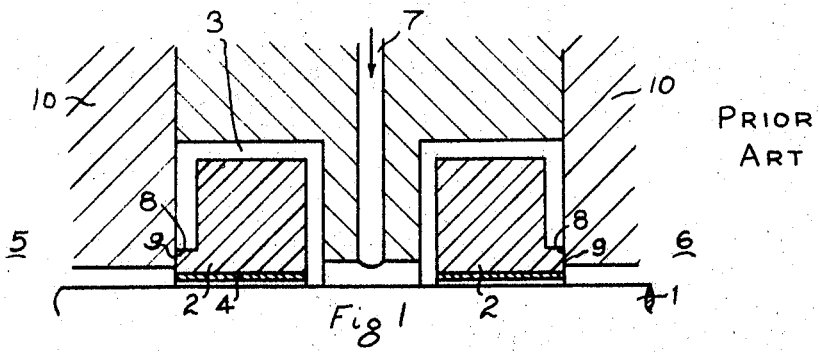
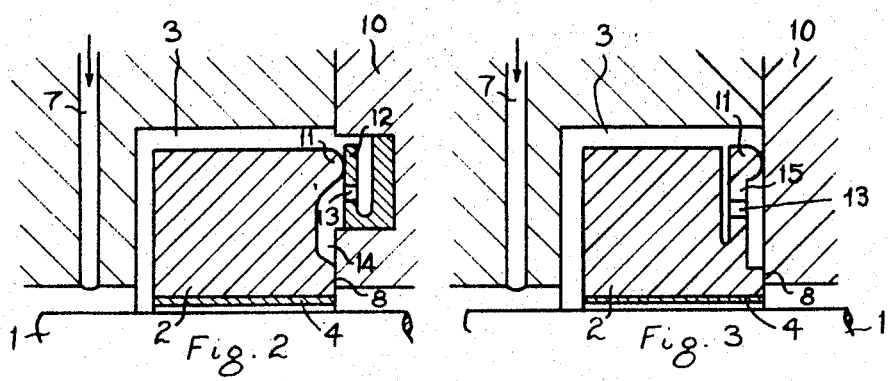
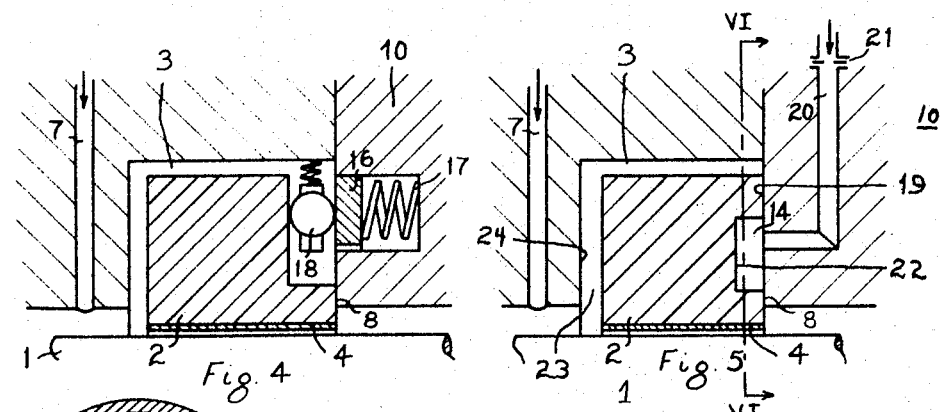
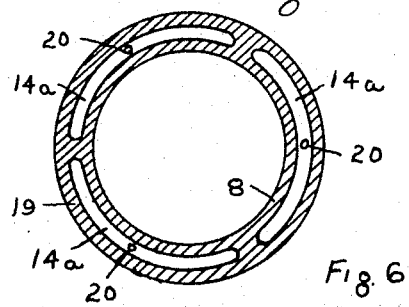

3,462,159
Patented Aug. 19, 1969

3,462,159
FLOATING-RING TYPE SHAFT SEAL
Hans Baumann, Nussbaumen, and Edoardo Erni and Attila Horváth, Baden, Switzerland, assignors to Aktiengesellschaft Brown, Boveri & Cie., Baden, Switzerland, a joint-stock company
Filed Apr. 27, 1967, Ser. No. 634,177
Claims priority, application Switzerland, June 17, 1966, 8,825/66; July 15, 1966, 10,323/66
Int. Cl. F16j 15/34, 15/54
U.S. Cl. 277—27          8 Claims

ABSTRACT OF THE DISCLOSURE

A shaft seal structure for sealing a shaft where it extends to atmosphere through an opening provided in a wall of the housing in which the shaft is located is established by means of a floating ring which surrounds the shaft and is positioned in an annular recess opening in the direction of the shaft. A pressurized barrier fluid medium is introduced into the recess to apply an axially directed force on the floating ring so that a radially inner part thereof is caused to bear against a corresponding located internal sealing surface of the housing wall adjacent the wall opening at the passthrough point of the shaft thereby to establish the shaft seal. In order to maintain mobility of the floating ring in a radial direction, a counter acting axial force is applied to the ring which acts to partially relieve the pressure which the ring exerts against the sealing surface. This counter acting axial force can be established in a mechanical manner by use of an axially resilient ring which acts axially against the floating ring, and it can also be established as a hydraulic force by introducing a fluid under pressure to the side of the floating ring opposite to that on which the pressurized barrier fluid exerts its pressure.

---

The present invention relates to a floating-ring mechanical seal for sealing the extension of a shaft through a housing wall by means of a floating ring which, due to thrust forces acting thereon by virtue of a barrier medium, bears axially and sealingly against the said housing, surrounds the shaft with slight clearance and is radially movable for adaptation to the shaft movements.

The method of operation of floating-ring mechanical seals is based on the throttling effect of a narrow gap formed between shaft and bearing bush. The floating rings are freely movable and are self-centering, thus minimizing the danger of physical contact with the shaft. They represent a most reliable structural element because they are practically free of wear and are therefore unaffected by changes of the operating condition.

In the accompanying drawings which have been included to enable the invention to be better understood:

FIG. 1 is a view in longitudinal axial section of a floating-ring type shaft seal of know construction;

FIGS. 2, 3 and 4 are also views in longitudinal axial section illustrating three different embodiment of the improved shaft seal wherein mechanical means of various types are utilized to relieve the floating ring from axial thrust;

FIG. 5 is a view in longitudinal axial section of still another embodiment of the invention wherein a hydraulic device is utilized for relieving the floating ring of axial thrust; and FIG. 6 is a section through the ring chamber perpendicularly to the axis along line VI—VI in FIG. 5 and drawn to a smaller scale.

As indicated above, a floating-ring mechanical shaft seal of known construction is illustrated in FIG. 1. There it will be noted that the shaft 1 is surrounded by two floating rings 2 disposed in a recess 3 of the housing wall and lined with bearing metal 4 on their interior. They serve to seal the space 5 within the housing under high pressure relative to that of the atmosphere 6. To this end, a barrier medium, for example a hydraulic fluid such as oil, is supplied under pressure through the pipeline 7 so that under the action of the said barrier medium, each floating ring bears with its end, ring-shaped sealing surface 8 against an internal surface 9 of the housing 10. It is sufficient for the barrier medium to be supplied with a relatively slight positive pressure relative to the pressure prevailing in the space 5 in order to safely prevent escape to atmosphere from the space 5.

The forces acting on the right-hand ring in FIG. 1 and pressing it axially against the sealing surface 8 are greater than those acting upon the left-hand ring because only the low atmospheric pressure counteracts on the exterior. Relief may be obtained in a known manner by minimizing the size of the sealing surface so that the floating ring is almost entirely flushed by barrier medium.

However, it has been shown that this construction is suitable only for pressures of up to approximately 30 atm. At higher pressures the thrust force acting on the floating ring, and which must be absorbed by the sealing surface, becomes so great that the ring can no longer easily follow the radial movements of the shaft, such movement being possible only when the frictional force occurring in the sealing surface is relatively small. If the barrier medium is subjected to elevated pressures, which may amount to 200 atm., the residual axial thrust acting upon the floating sealing ring becomes exceptionally high even if the dimensions of the sealing surface are reduced to a minimum. Accordingly, the radial displacement forces becomes so great that the shaft is no longer guided in the bearings and is guided in the floating rings.

It is known to distribute the pressure gradient between barrier medium and atmosphere over several rings (for example as described in the journal "Konstruktion," 1964, No. 8, p. 341) but this procedure does not provide a completely satisfactory solution. The said proposed solution improves sealing and enables the individual ring to be more easily displaced, but the total displacement force for all rings remains unchanged.

It is the purpose of the present invention to retain radial movability of the floating-ring mechanical seal even at the highest pressures to be sealed. According to the invention the sealing surface of the floating ring is relieved of pressure by bearing on at least one additional force-transmitting surface on the housing. By separating from the sealing surface at least part of the surface transmitting axial thrust, the said sealing surface may be practically freely dimensioned in accordance with the dictates of the sealing requirements. The radial extension of the sealing surface may therefore be constructed to smaller dimensions than those which would be required for combined sealing and supporting functions, so that the thrust relief surface of the ring is increased and the axial thrusts acting upon the ring and therefore the ring displacement force is minimized.

As previously indicated, several examples of the invention are shown in the drawings. FIGS. 2, 3 and 4 illustrate in axial section various mechanical arrangements and FIGS. 5 and 6 a hydraulic arrangement for relieving the floating ring of axial thrust. Identical components are provided with the same references in all figures of the drawing.

According to FIG. 2 the floating ring 2 is provided at the end face near the external circumference with an annular bead 11 by means of which it bears against a ring 12, resiliently biased in the axial direction and disposed in the housing 10. The term "housing" is to be loosely understood in this sense and may also refer to a retaining ring fixedly connected to the housing. The ring 12 has several circumferentially spaced axial bores 13 disposed in it so that the annular recess 14 formed between the bead 11 and the sealing surface 8 is reliably under the full effect of the liquid or gaseous barrier medium supplied through the pipeline 7 so that the floating ring 2 in annular recess 3 is partially relieved of thrust. The resilient ring and the floating ring are so constructed and adapted to each other that under the effect of the axial thrust (to the right in the drawing) acting on the floating ring, the bead 11 first bears against the resilient ring 12 which is elastically deformed and thus absorbs at least part of the axial thrust. Only then will the sealing surface 8 bear against the housing 10 and seal the barrier medium with respect to atmosphere. The pressure acting upon the sealing surface is substantially smaller than the entire axial thrust acting upon the floating ring and may be reduced to zero depending on the construction of the resilient ring. The floating ring remains easily radially movable even with the highest pressure in the barrier medium because the frictional forces in the sealing surface 8 are now small and the sealing surface area can be kept so small as is just necessary for sealing so that the thrust relief obtained by the barrier medium surrounding the floating ring becomes large, and finally by the sliding pad construction of the bead disposed for outside in the radial direction as the result of which a hydrodynamic upthrust is obtained in the additional force-transmitting surface thus producing a small coefficient of friction.

The resilient ring may also be connected to the floating ring. According to FIG. 3, the floating ring 2 and the resilient ring 15 which in this case is provided with the bead 11, is constructed of one piece. The effect to be obtained is the same as in the previous example. It should, however, be mentioned that in both embodiments it is possible for the bead to be disposed on the opposite surface, that is to say in FIG. 2 on the resilient ring 12, in FIG. 3 on the internal wall 9 of the housing 10. The method of operation remains practically unchanged. Moreover, it is not necessary for the bead to form a completely integral annular surface but it may also be interrupted at certain positions. An arrangement of two or more concentrically disposed beads is also possible.

According to FIG. 4, the axial thrust transmitted to the resilient ring 16 is absorbed by circumferentially spaced, axially acting compression springs 17 disposed in the housing 10. A bead may also be employed in this case but the said embodiment illustrates another method of force transmission. A rolling bearing 18 is disposed between the floating ring 2 and the ring 16 so that a rolling motion is obtained instead of the sliding motion. The rolling bearing is resiliently suspended in order to maintain it in the correct position.

The method of operation is the same as in the embodiment according to FIG. 2. First, the compression springs 17 absorb via the ring 16 at least part of the axial thrust acting upon the floating ring, before the sealing surface 8 bears against the internal surface of the housing. The ring 16 and the compression springs 17 may also be disposed in the floating ring 2.

In the embodiments according to FIGS. 2 to 4 it is not absolutely necessary for the sealing surface 8 to bear against the housing while absorbing part of the axial thrust. It is also possible to employ a viscosity seal, that is to say, the additional supporting surface transmits the entire axial thrust and the sealing surface does not bear against the internal wall of the housing but a gap remains which must be sufficiently narrow in order to reduce the flow of barrier medium to an extent which will ensure adequate sealing.

Another embodiment of the invention is illustrated in FIGS. 5 and 6. The additional force-transmitting surface 19 is constructed as a sealing surface. According to a further embodiment, the annular recess 14 disposed between the two sealing surfaces 8 and 19 communicate with the pressure medium delivery pipeline 20. A medium, which is appropriately the same as barrier medium, but is at a higher pressure than the said medium, is supplied through the aforementioned pipeline. In this case the two pipelines 7 and 20 may be fed from the same system except that the pressure in the pipeline 7 must previously be reduced in order to be lower than the pressure prevailing in the pipeline 20.

In this embodiment, the pressure cushion formed in the annular space 14 acts against the thrust forces which are directed to the right in the drawing. Depending on the amount of pressure in the annular recess 14, it is possible for the thrust force acting on the two sealing surfaces to be reduced to zero. It is appropriate for a regulating element 21 to be incorporated into the delivery line 20 in order to maintain the amount of barrier medium flowing into the annular recess 14 as small as possible. Accordingly, minimum gaps will result on the two sealing surfaces 8 and 19 respectively, to produce a viscosity seal. Should the pressure in the annular space become too large, the gaps will increase, the amount of barrier medium discharged will rapidly increase and the entire pressure system could become ineffective.

If only a single annular recess 14 is provided it is possible for the floating ring to assume a skewed position and to bear at one point on the housing so that the necessary radial displacement forces once again increase while at the same time the floating ring and its mating surface is in danger of being damaged. To avoid this advantage the annular recess chamber 14 is circumferentially subdivided into at least three recesses 14a as indicated in FIG. 6. This necessitates each recess being in communication with its own delivery pipeline 20 through which it is supplied with pressure medium. If all delivery pipelines are supplied from a common pump or a common reservoir it will be convenient to provide each delivery pipeline with a separate throttling element 21. It is also possible to employ a volumetric pump in place of a pump and throttling elements where such pump delivers a metered quantity. In this case it is advantageous for each recess 14a to be fed from at least one separate cylinder of the aforementioned pump. The pressure required for lifting off the floating ring will then automatically adjust itself. The delivery rate also determines the size of the gap on the sealing surfaces.

Although in the example described heretofore the annular recess subdivided into separate recesses was provided in the floating ring, the application of the invention is not confined to this embodiment. The integral annular recess as well as the annular recess subdivided into individual recesses may be disposed in the housing 10.

When the floating ring is lifted off it is possible for it to become subject to periodic axial motions. To avoid such motions it is possible for the gap 23 between the non-sealing surface 24 of the floating ring and the housing wall 3 to be so dimensioned that the barrier medium present in the gap exercises a damping effect. A gap size of approximately 0.4 mm. has been found suitable for this purpose.

Owing to the manner in which the sealing surface of the floating ring is relieved of thrust, the said floating ring remains easily radially movable even at the highest prevailing pressures, thus practically eliminating the possibility of damage to the sealing surface or its mating surface, otherwise to be expected due to displacement under high contact pressures, or if the floating ring assumes a skewed position.

We claim:

1. In a shaft seal structure for sealing a shaft where it extends to atmosphere through an opening provided in a wall of the housing in which the shaft is located, the combination comprising means establishing an annular recess in the body of the housing and which opens radially inward in the direction of said shaft, a sealing ring disposed in said annular recess, said sealing ring surrounding said shaft and being slightly radially spaced therefrom to establish a floating action, means for introducing a pressurized barrier fluid medium into said recess for applying a first axial force on said ring in such direction as to cause a radially inner part thereof to bear against a correspondingly located internal sealing surface of said housing wall adjacent the wall opening at the passthrough point of said shaft thereby to establish a shaft seal, and means establishing a second axial force on said ring acting in a direction counter to that of said first force for effecting partial relief of the axial thrust imposed by said first force upon said internal sealing surface, said means for establishing said second and counter acting axial force being constituted by an axially resilient ring whose force is applied axially against said sealing ring along a circumferential path located radially outward from said internal sealing surface of said housing wall.

2. A shaft seal structure as defined in claim 1 wherein said axially resilient ring is seated in a second annular recess in said housing wall, said resilient ring being engaged by a portion of said sealing ring radially outward from said internal sealing surface of said housing wall.

3. A shaft seal structure as defined in claim 1 wherein said axially resilient ring is seated in a second annular recess in said housing wall, said resilient ring being engaged by an axially projecting circular bead on said sealing ring.

4. A shaft seal structure as defined in claim 3 wherein said axially resilient ring is provided with a plurality of circumferentially spaced axial bores placing said fluid pressurized annular recess in which said sealing ring is located in communication with an annular space located intermediate said circular bead and said internal sealing surface of said housing wall.

5. A shaft seal structure as defined in claim 1 wherein said axially resilient ring forms an integral part of said sealing ring and is provided with a circular bead bearing axially against said internal sealing surface of said housing wall.

6. A shaft seal structure as defined in claim 1 wherein said axially resilient ring is seated in a second annular recess in said housing wall, said ring being made axially resilient by means of a spring located in second annular recess and bearing against said ring.

7. A shaft seal structure as defined in claim 6 and which includes a rolling bearing interposed between a surface on said floating ring and said resilient ring.

8. A shaft seal structure as defined in claim 1 wherein the non-sealing side of said sealing ring is spaced from the adjoining surface of said annular recess in said housing body by a gap the width of which can vary up to approximately 0.4 mm.

References Cited

UNITED STATES PATENTS

| | | | |
|---|---|---|---|
| 1,689,874 | 10/1928 | Jabs | 277—27 |
| 2,265,953 | 12/1941 | Mortensen et al. | 277—74 |
| 2,538,422 | 1/1951 | Kollsman | 277—27 |
| 2,621,946 | 12/1952 | Jendrassik | 277—74 |
| 3,047,299 | 7/1962 | Karsten | 277—74 X |
| 3,093,382 | 6/1963 | Macks | 277—27 |
| 3,155,393 | 11/1964 | Hummer | 277—74 |
| 3,315,968 | 4/1967 | Hanlon | 277—27 X |
| 3,347,552 | 10/1967 | Frisch | 277—27 |

FOREIGN PATENTS 531,064   8/1954   Belgium.

SAMUEL ROTHBERG, Primary Examiner

U.S. Cl. X.R.

277—74, 75, 83